United States Patent [19]

Hahn et al.

[11] 4,308,666
[45] Jan. 5, 1982

[54] LINEAR MICROMETER

[75] Inventors: Herbert Hahn, Loehnberg; Hans-Dieter Jacoby, Asslar-Werdorf; Richard Jung, Solms-Albshausen; Erich Schuster, Huettenberg, all of Fed. Rep. of Germany

[73] Assignee: Ernst Leitz Wetzlar GmbH, Wetzlar, Fed. Rep. of Germany

[21] Appl. No.: 57,977

[22] Filed: Jul. 16, 1979

[30] Foreign Application Priority Data

Jul. 21, 1978 [DE] Fed. Rep. of Germany ....... 2832038

[51] Int. Cl.³ .............................................. G01B 7/02
[52] U.S. Cl. .................................... 33/166; 33/172 E
[58] Field of Search ............ 33/125 A, 125 C, 172 E, 33/169 R, 170, 143 L, 147 N, 166

[56] References Cited

U.S. PATENT DOCUMENTS 3,816,002 6/1974 Wieg ............................. 33/125 C X
4,117,601 10/1978 Kober et al. .................. 33/125 C X
4,152,837 5/1979 Nelle et al. ...................... 33/125 C

FOREIGN PATENT DOCUMENTS 392379 9/1908 France .

Primary Examiner—Harry N. Haroian
Attorney, Agent, or Firm—Schwartz, Jeffery, Schwaab, Mack, Blumenthal & Koch

[57] ABSTRACT

Disclosed is a linear micrometer which comprises a cylindrically shaped housing, a tube-shaped sleeve displaceably mounted along the longitudinal axis of the housing and extending from one end of the housing, a measurement scale fixedly mounted along the longitudinal axis of the housing and slidingly supported inside the spindle sleeve, and a measurement readout means couple to the spindle sleeve for reading and displaying the relative position of the spindle sleeve to the scale. A rapid adjusting means and fine adjusting means are also provided.

18 Claims, 3 Drawing Figures

LINEAR MICROMETER

BACKGROUND OF THE INVENTION

1. Field of the Invention

The invention concerns a linear micrometer designed by the Abbe principle with a measuring spindle sleeve metering into a housing and a scale arranged within the housing in a stationary manner and a readout device correlated with the scale and coupled with the measuring spindle sleeve to indicate measured distances, preferably by digital electrical means.

2. Description of the Prior Art

A linear micrometer is a device for the measurement of small lengths and distances wherein the measuring spindle sleeve is driven by means of crossed helical gears with a slight pitch and the measuring means is a linear scale. Micrometers having an extended measuring range and equipt with rapid setting means which may be released from the helical gears are known (for example, as described in German Offenlegungsschrift No. 16 23 170).

Observation of Abbe's principle requires that the measuring means constitute an extension of gage length, i.e. the axis of the measuring spindle sleeve and the measuring means, are aligned with each other. Concerning the measurement of the displacement of the measuring spindle sleeve, it is known especially in the case of digital electrical distance acquisition to either couple the measuring means with the measuring spindle sleeve and to move it past the stationary readout device, or to couple the readout device with the measuring spindle sleeve and to move it past the stationary scale (as shown in U.S. Pat. No. 2,592,264). The last-mentioned arrangement has the particular advantage of a shorter length of the device, but also poses higher requirements for the accuracy of the guidance of the measuring spindle sleeve (see for example, K. Rantsch "Optics of Fine Measuring Techniques" (1949, page 191.)

A longitudinal distance measuring device is taught in German Auslegeschrift No. 26 05 020 having a scale solidly mounted at its two ends within a housing. The readout device is displaced on a straight line slide bar arranged parallel to the scale by means of a cable line. To maintain a constant reading angle, an additional rotation stop is provided for the readout device. The measuring spindle sleeve is resolved into three rods secured to the readout device and emerging from the housing through three bores. Outside the housing the three rods are maintained together by means of a plate wherein a probe tip is set, the probe being aligned with the axis of the scale. The measuring accuracy in this case depends on the accuracy of the guidance of the readout device relative to the scale. Because the rods forming the measuring spindle are without guidance over their full length, they constitute a relatively long lever around which the probe tip may be rotated out of the axis of the scale, thus violating Abbe's principle.

SUMMARY OF THE INVENTION

It is an object of this invention to provide a linear micrometer of the shortest possible structural length which satisfies Abbe's principle and avoids the effects of guidance errors during the displacement of the measuring spindle relative to the scale over a large measuring range. Further, the rapid setting of the measuring spindle from any of its positions is made possible without affecting the fine adjustment by means of the crossed helical gears.

These and other objects are attained with a linear micrometer of the present invention. Additional advantageous embodiments of the linear micrometer also result from the features set forth hereinafter.

The invention comprises a linear micrometer having a cylindrically shaped housing within which a tube-shaped spindle sleeve is displaceably mounted along the longitudinal axis of the housing and extends outwardly from one end of the housing. A measurement scale is fixedly mounted along the longitudinal axis of the micrometer housing and, at the same time, is slidingly supported inside the spindle sleeve. The micrometer also contains a measurement readout means such as a digital electronic readout coupled to the spindle sleeve for reading and displaying the relative positions of the spindle sleeve with respect to the scale. At one end of the linear micrometer housing, a single point bearing member connects the scale to the end of the housing opposite the ends of the extending spindle sleeve. The single point bearing is preferably in line with the measurement divisions on the scale member. More specifically, the single point bearing comprises a sphere aligned with its center along the longitudinal axis of the scale and contains a means for biasing the scale against the sphere and micrometer housing end. Normally, the biasing means comprises a tension spring which connects to the scale and micrometer housing end and pulls the scale towards the micrometer housing end with the sphere in between.

The spindle sleeve is mounted within the housing on cylindrical slide bearings, at least one of which provides guidance for the spindle sleeve in the housing, and at least one of which provides guidance for the scale within the spindle sleeve.

The linear micrometer also includes a means for the rapid adjustment of the spindle sleeve as well as a means for the fine adjustment of the spindle sleeve in relation to the scale. The rapid setting means or rapid adjustment means comprises at least one locating drive member having a control bolt for adjusting the tension through a means biasing the bolt against the scale. The bolt extends through a longitudinal slit in the housing and the slit defines the area of movement of the adjustment means longitudinally within the housing.

The fine adjustment means on the other hand comprises at least one rod member, and preferably two rod members abutting a fine adjustment knob at one end of the micrometer housing and extending parallel to the spindle sleeve in the housing to a point where it communicates with the rapid adjustment means. Thus, movement of the rapid adjusting means provides gross adjustment of the spindle sleeve to the appropriate length whereas the fine adjustment means provides the exact measurement desired.

The locating drive member comprises in a preferred embodiment a clamping arm member pivotably attached at one end to a mounting member within the housing. The other end of the clamping arm is pivotably attached to a portion of the control bolt that extends within the housing. Movement of the control bolt, therefore, in a direction perpendicular to the spindle sleeve causes corresponding opposite movement at the other end of the clamping arm. Preferably, the clamping arm rests against the rod member extending parallel to the spindle axis. Depending upon the relative tension applied by the control bolt, the clamping arm may either prevent movement of the locating drive member longitudinally within the housing, or permit movement. Of course, the movement is limited by the length of the longitudinal slit.

In a preferred embodiment, the spindle sleeve and the locating drive member are attached to a mounting member displaced within the housing.

The inside surface of the micrometer housing comprises a housing sleeve supported rotatably about the spindle sleeve axis. This sleeve displays a helical groove which intersects with the longitudinal slit in the housing at a point where the locating drive or control bolt portion of the locating drive passes through the longitudinal slit.

At the end of the linear micrometer, that is the end of the spindle sleeve extending from the micrometer, is positioned a probe tip. The probe tip is preferably a replaceable probe tip and may advantageously be secured to a shoe member biased against a measuring object.

The design of the measuring spindle sleeve in the form of a tube provides great rigidity together with low weight. The tube may be guided by means of one or two coaxial slide bearings in a very satisfactory manner. Suitably dimensioned, the tube may be inserted over the scale whereby the desirable short length is attained while ideally observing Abbe's principle. The pressure of the scale in the micrometer housing, which is only unilaterally elastic in combination with the slide bearing support within the spindle sleeve, makes possible a constant relative position between the readout device and the scale. No special alignment of the position of the scale with respect to the guidance of the measuring spindle sleeve is necessary because the sleeve itself guides the scale. The scale is aligned automatically with the axis of the measuring spindle over the entire range of the measurement.

The rapid setting means engages the measuring spindle directly. It is coupled with the fine adjusting means by means of a clamp. The coupling may be released and reinstated in any position. The crossed helical drive of the fine adjustment therefore requires only a slight slope which again favors a short length of the micrometer. The slit provided to guide the control lever of the rapid setting means is automatically covered by a concurrent internal cylinder whereby good protection of the measuring means and the readout device is obtained.

Further advantages of the invention will be found in the description of the preferred embodiments following hereinafter. These embodiments are schematically represented in the drawing attached hereto.

DETAILED DESCRIPTION OF THE PREFERRED EMBODIMENTS

Figure 1:
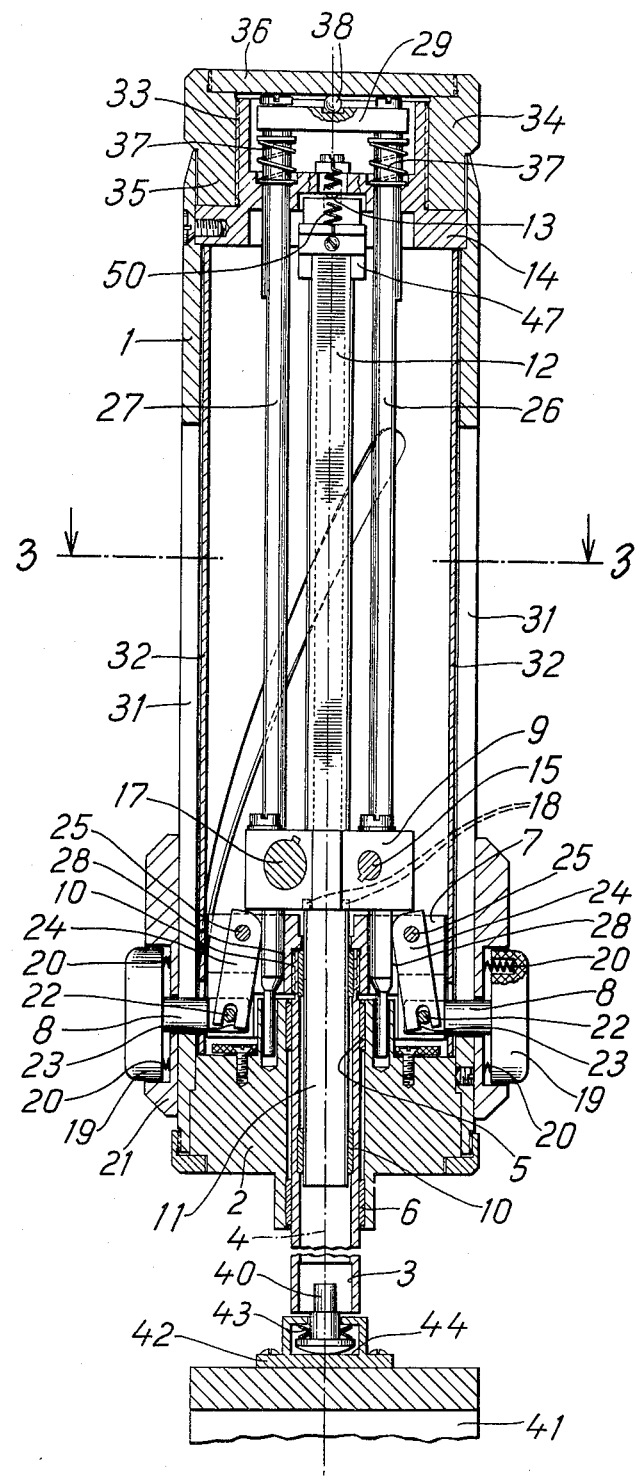
FIG. 1 shows a longitudinal section of the linear micrometer.

As shown in FIG. 1, the micrometer housing 1 is designed in the form of a cylinder with a circular cross section. It comprises on one of its ends a housing cover 2, wherein the tube shaped measuring spindle sleeve 3 is guided in two slide bearings 5 and 6 arranged coaxially to the longitudinal axis 4 of the micrometer housing 1 and is capable of longitudinal displacement. At its end located in the micrometer housing, the spindle sleeve 3 is screwed into a mounting body 7 to which a locating gear drive for rapid setting (8, 22, 23, 24) and a readout device 9 are also secured.

Two slide bearings 10 are arranged at the end of the spindle sleeve 3 located at the mounting body 7 and within the spindle sleeve concentrically with the housing axis 4. One end of the scale 11 is slidingly supported in the slide bearings. The scale consists of a round rod as the support. The rod is flattened in the longitudinal direction. A reflecting scale for measuring, i.e. with marked divisions 12, is arranged on this flattened part with the direction of the division markings parallel to the housing axis 4. The other end of the scale is connected with a second housing cover 14 by means of a single point bearing formed by a sphere 13, so that the scale may be displaced perpendicularly to the housing axis 4.

The photoelectric scanning of the measuring division is effected by means of a readout device 9, such as is known for example from German Auslegesschrift No. 26 53 545. The readout device consists of an illuminating member 15, a reference grating 16 (see FIG. 2) and a photoelectric receiver system 17. The readout device 9 is rigidly connected with the mounting body 7, while the reference grating is located parallel to the marked scale division 12. To set a certain distance and as security against relative rotation between the reference grating 16 and the marked scale division 12, two plastic knobs 18 are fastened to the readout device 9, which are supported to the right and to the left of the scale by the flat side of the scale support rod 11.

Two control bolts 8 acting perpendicularly to the housing axis 4 are set in opposing bores of the mounting body 7. Outside the micrometer housing 1, pressure plates 19 are placed on said bolts 8 with the pressure plates being supported by means of compression springs 20 on a sleeve 21 which is slidable on the micrometer housing. The ends of each control bolt 8 closest to the housing axis 4 of the micrometer is coupled with a clamping lever 24 by means of a pin/slit connection 22/23. The longitudinal axis of said levers extend in the direction of the housing axis 4. The clamping levers 24 may be rotated at their end facing away from the pin/slit connection, each around an axle 25 is supported in the mounting body 7. Elements 8, 22, 23, 24 constitute the locating drive.

Figure 3:
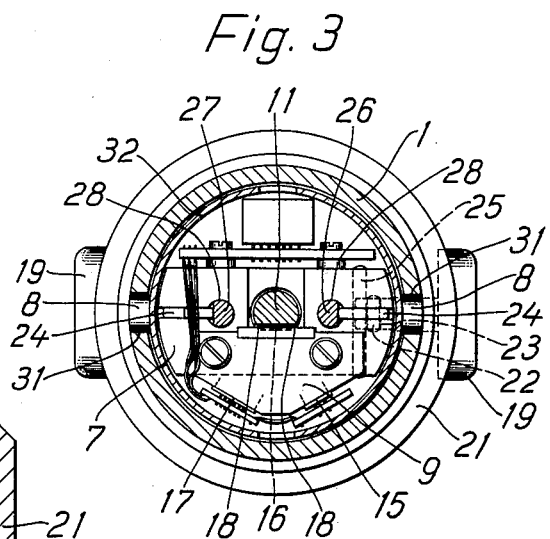
FIG. 3 shows a cross section of the linear micrometer taken along line 3—3 of FIG. 1 in the area of the rapid adjustment means.

As shown in FIG. 3, the sectional plane containing the control bolts 8 and the clamping levers 24 display two rods 26, 27 arranged parallel and symmetrically to the axis of the housing. In FIG. 1, these rods 26, 27 are shown to extend in the bores 28 through the mounting body 7 and mounted on the one hand in the housing cover 2 with an axial clearance and displaceable in the longitudinal direction and, on the other hand, passed through the housing cover 14 without play. Adjacent housing cover 14, the two rods 26, 27 are connected with each other by means of a plate 29.

The position of the rods 26, 27 is chosen so that they may be secured by clamping by means of the clamping levers 24 in their bores 28. The clamping levers are secured under the pressure of the springs 20. In order to improve the clamping action, the rods 26, 27 are advantageously flattened at their sides facing the clamping levers, and the clamping levers are rounded in the pressure area, whereby the center of curvature of the rounding is located in front of the rotational axis 25. This provides a favorable force translation ratio to the lever arm provided by the distance between the rotational axes 25 and 22.

The compression of the pressure plates 19 releases the arrest of the rods 26, 27 so that the spindle sleeve 3, together with the readout device 9 which is rigidly coupled with the spindle sleeve, may be displaced along the housing axis 4. The control bolts 8 are guided in the process in the slit 31 of the housing wall which is parallel to the housing axis 4. This design simultaneously represents a rotation stop for the spindle sleeve 3. In order to protect the inside of the micrometer housing 1 against dirt, a thin walled cylinder 32 is arranged underneath the groove 31 inside the housing 1. The cylinder is supported rotatingly by the two covers 2 and 14. Two helical grooves are machined into the cylinder 32 which crossingly intersect with groove 31. The control bolts 8 are passed through the intersection. Upon the actuation of the rapid setting means or device, this intersection slides along groove 31 due to the ability of the cylinder 32 to be rotated. The openings remaining because of the slope of the helices in the groove 31 adjacent to the above-mentioned intersection are covered by the sleeve 21.

As soon as the rods 26, 27 are clamped securely in the mounting body 7, the fine setting of the measuring spindle sleeve 3 may be effected by means of pressure or tension on the rods 26, 27. For this purpose, a fine threading 33 is provided on the housing cover 14, upon which a nut 35 equipped with a knurled head 34 may be adjusted in the direction of the housing axis 4. In the area of the knurled head 34, the opening of the nut 35 is covered with a plate 36. The plate 29 connecting the rods 26, 27 lies against the plate 36 under the pressure of two springs 37, which are supported by the cover 14. The plate 29 is supported by means of a sphere as a single point bearing 38.

For the purpose of scanning the workpiece, a spherical probe tip 40 is set in the spindle sleeve 3. In a special application, even an object table 41 may be displaced measuringly with the aid of a stationary linear micrometer. In this case, it is convenient to couple the spindle sleeve 3 by way of the probe tip 40 with the object table 41. This coupling may be effected, for example, by means of a shoe 42 set on the probe tip 40, said shoe being rigidly connected with the object table. Within the shoe 42, the probe tip 40 is pressured by springs 43 against the sole 44.

Figure 2:
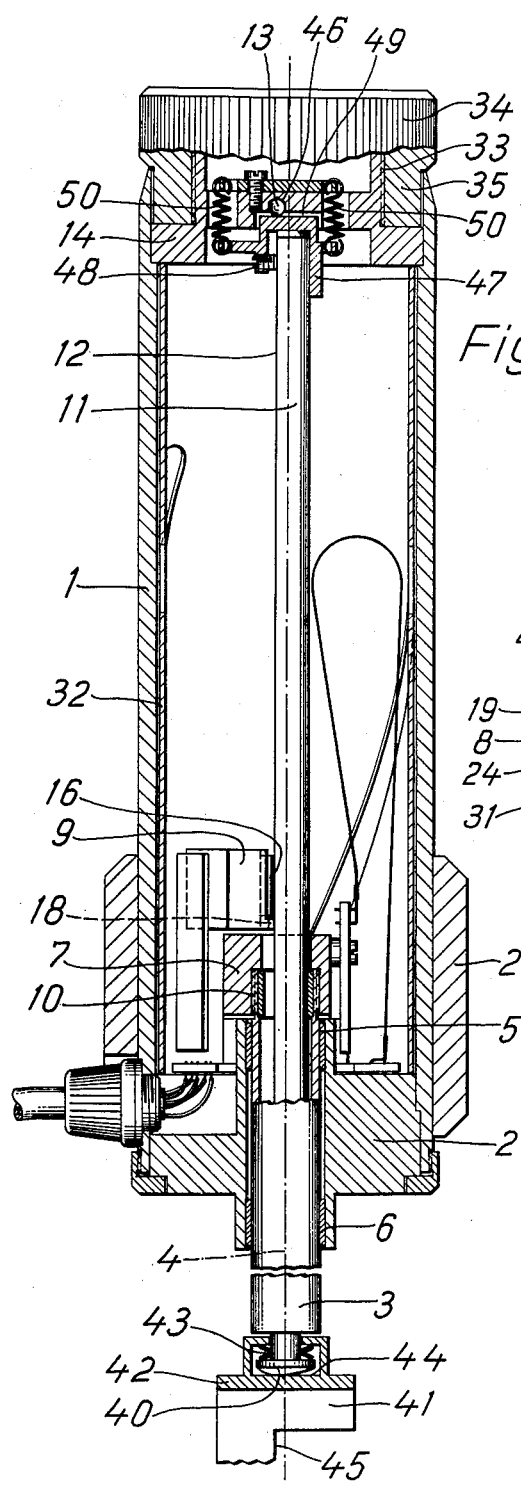
FIG. 2 shows another longitudinal section perpendicularly to the first section.

The sectional view of FIG. 2 displays the flattening of the scale 11 and the position of the readout device 9 relative to the scale. The view particularly shows the safety against rotation of the scale provided by the plastic knobs 18 and the aerial distance between the reference grating 16 and the scale 11. Because the scale division 12 is located on the flattened part of the scale 11 and because according to Abbe's principle, the gage length should be a straight line extension of the embodiment of the measure, the apex of the spherical surface of the probe tip 40 is placed out of the axis 4 of the housing into the plane of the scale division 12. The support surface 45 on the object table 41 is also located in this plane.

As another detail of the view in FIG. 2, the pressure bearing support of the scale 11 on the housing cover 14 may also be seen. The sphere 13 is supported, for example, in a conical bore 46 in the scale division axis on the cover 14. The end of the scale 11 is clamped in a clamp 47 by means of a screw 48. The terminal surface 49 of the clamp 47 is pulled against the sphere 13 by springs 50 hooked into the cover 14 and the clamp 47. This support maintains the terminal surface of the scale 11 without redundancy in determination with respect to the scale guidance in the spindle sleeve.

The sectional view in FIG. 3 demonstrates the clamping between the rods 26, 27 and the mounting body 7. The design of the photoelectric scale reading 11, 15, 16, 17, is also shown schematically.

What is claimed is:

1. A linear micrometer comprising:
   a cylindrically shaped housing;
   a tube-shaped sleeve displaceably mounted for displacement along the longitudinal axis of said housing and extending from one end of said housing;
   a measurement scale fixedly mounted along the longitudinal axis of said housing and slidingly supported inside said tube-shaped sleeve, and
   a measurement readout means coupled to said tube-shaped sleeve for reading and displaying the relative position of said tube-shaped sleeve to said scale,
   wherein a single point bearing connects said scale to the end of said housing opposite the end of said extending tube-shaped sleeve.

2. The linear micrometer of claim 1, wherein a single point bearing connects said scale to the end of said housing opposite the end of said extending tube-shaped sleeve.

3. The linear micrometer of claim 2, wherein said single point bearing is aligned with measurement divisions on said scale.

4. The linear micrometer of claim 3, wherein said single point bearing comprises a sphere aligned with its center at the longitudinal axis of said scale and a means for biasing said scale against said sphere and said micrometer housing end.

5. The linear micrometer of claim 4, wherein said biasing means comprises a tensioned spring connecting said scale and said micrometer housing end.

6. The linear micrometer of claim 4, wherein at least one cylindrical slide bearing is provided for the guidance of said tube-shaped sleeve in said housing.

7. The linear micrometer of claim 5, wherein at least one slide bearing is provided for the guidance of said scale in said tube-shaped sleeve.

8. The linear micrometer of claim 4 comprising further a means for the rapid adjustment of the tube-shaped sleeve in relation to said scale.

9. The linear micrometer of claim 8 comprising further a means for the fine adjustment of said tube-shaped sleeve in relation to said scale.

10. The linear micrometer of claim 9, wherein said rapid adjustment means comprises at least one locating drive member having a control bolt for adjusting the tension through a means for biasing said bolt against said scale, said bolt extending through a longitudinal slit in said housing said slit defining the area of movement of said adjustment means longitudinally within said housing 11. The linear micrometer of claim 10, wherein said fine adjustment means comprises at least one rod member abutting a fine adjustment knob and extending parallel to said tube-shaped sleeve in said housing and communicating with said rapid adjustment means.

12. The linear micrometer of claim 11, wherein said locating drive member further comprises a clamping arm member pivotally attached at one end to a mounting member within said housing and pivotally attached at the other end to a portion of said control bolt within said housing wherein movement of said control bolt in a direction perpendicular to said tube-shaped sleeve causes corresponding movement in said clamping arm against said rod member.

13. The linear micrometer of claim 12, wherein said tube-shaped sleeve and locating drive member are fixedly attached to said mounting member.

14. The linear micrometer of claim 13, comprising further a housing sleeve supported rotatably about said tube-shaped sleeve axis and having a helical groove intersecting with said longitudinal slit at the point of passage of said control bolt through said slit.

15. The linear micrometer of claim 14, comprising further a probe tip mounted on the end of said tube-shaped sleeve extending from said housing.

16. The linear micrometer of claim 15, wherein said probe tip is biased against a shoe member secured to a measuring object.

17. The linear micrometer of claim 1, wherein said measurement readout means is an electronic digital member.

18. The linear micrometer of claim 17, wherein said electronic digital member comprises a photoelectric receiver, and an illuminating member and a reference grating.

* * * * *